United States Patent
Ando et al.

(10) Patent No.: US 11,862,012 B2
(45) Date of Patent: Jan. 2, 2024

(54) VEHICLE CONTROL SYSTEM AND SERVER

(71) Applicant: HITACHI ASTEMO, LTD., Ibaraki (JP)

(72) Inventors: Koichi Ando, Hitachinaka (JP); Keisuke Ampo, Hitachinaka (JP); Tao Lin, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 283 days.

(21) Appl. No.: 17/292,532

(22) PCT Filed: Nov. 8, 2019

(86) PCT No.: PCT/JP2019/043803
§ 371 (c)(1),
(2) Date: May 10, 2021

(87) PCT Pub. No.: WO2020/110657
PCT Pub. Date: Jun. 4, 2020

(65) Prior Publication Data
US 2021/0396529 A1    Dec. 23, 2021

(30) Foreign Application Priority Data

Nov. 29, 2018  (JP) ................................ 2018-223852

(51) Int. Cl.
*G08G 1/01*     (2006.01)
*B60W 60/00*    (2020.01)
(Continued)

(52) U.S. Cl.
CPC ......... *G08G 1/0141* (2013.01); *B60W 60/001* (2020.02); *G01C 21/387* (2020.08);
(Continued)

(58) Field of Classification Search
CPC .. G08G 1/0141; G08G 1/09; G08G 1/096775; B60W 60/001; B60W 2552/05;
(Continued)

(56) References Cited

U.S. PATENT DOCUMENTS 10,895,468 B2 *  1/2021  Yang ...................... G08G 1/052
11,168,989 B2 * 11/2021  Fowe ...................... G06F 17/18
(Continued)

FOREIGN PATENT DOCUMENTS

JP    2009-128327 A    6/2009
JP    2010-210405 A    9/2010
(Continued)

*Primary Examiner* — Dale W Hilgendorf
(74) *Attorney, Agent, or Firm* — Volpe Koenig

(57) ABSTRACT

A vehicle control system includes a control unit for vehicle control and a server which distributes map information to the control unit. The map information includes information on a first type of road whereby full or partial driving assistance of the vehicle is possible, and information on a second type whereby full or partial driving assistance of the vehicle are not possible. The server includes an output unit which transmits information on a second type of road existing in a predetermined range from a first type of road on which the vehicle is traveling, and such that the first and second types of road form a predetermined angle or less. The control unit includes a map management unit including information on the first and second types of road, and a vehicle control unit controlling the vehicle by using the information on the first and second types of road.

12 Claims, 8 Drawing Sheets

(51) Int. Cl.
  *G08G 1/09* (2006.01)
  *G01C 21/00* (2006.01)
  *G08G 1/0967* (2006.01)

(52) U.S. Cl.
  CPC ........... *G01C 21/3815* (2020.08); *G08G 1/09* (2013.01); *G08G 1/096775* (2013.01); *B60W 2552/05* (2020.02); *B60W 2556/50* (2020.02)

(58) Field of Classification Search
  CPC ........... B60W 2556/50; G01C 21/3815; G01C 21/387
  See application file for complete search history.

(56) References Cited

U.S. PATENT DOCUMENTS

| | | | |
|---|---|---|---|
| 11,594,133 B2* | 2/2023 | Kiley | G08G 1/096783 |
| 2007/0106459 A1* | 5/2007 | Nakayama | G08G 1/096827 |
| | | | 701/533 |
| 2013/0311086 A1* | 11/2013 | Aoki | G01C 21/3844 |
| | | | 701/446 |
| 2014/0309833 A1* | 10/2014 | Ferguson | G05D 1/0088 |
| | | | 701/23 |
| 2017/0197634 A1* | 7/2017 | Sato | G01C 21/26 |
| 2017/0197635 A1* | 7/2017 | Sato | B60W 30/18154 |
| 2019/0383626 A1* | 12/2019 | Fowe | G08G 1/0145 |
| 2020/0056894 A1* | 2/2020 | Kawabata | G01C 21/3815 |
| 2020/0156627 A1* | 5/2020 | Wieschemann | B60W 10/18 |
| 2020/0262452 A1* | 8/2020 | Nagashima | G08G 1/207 |
| 2020/0310450 A1* | 10/2020 | Reschka | B60W 60/0011 |
| 2022/0242440 A1* | 8/2022 | Kurtz | G01C 21/3837 |

FOREIGN PATENT DOCUMENTS

| | | | | |
|---|---|---|---|---|
| JP | 2018-072069 A | | 5/2018 | |
| JP | 2018072069 A | * | 5/2018 | ............... G08G 1/00 |
| JP | 2018-096743 A | | 6/2018 | |

* cited by examiner

FIG. 12

| LANE ID | LATITUDE OF START POINT | LONGITUDE OF START POINT | ALTITUDE OF START POINT | LATITUDE OF END POINT | LONGITUDE OF END POINT | ALTITUDE OF END POINT | LANE TYPE | RIGHT LANE ID | LEFT LANE ID | REAR SIDE LANE ID[1] | REAR SIDE LANE ID[2] | ... | NUMBER OF FRONT SIDE LANES | FRONT SIDE LANE ID[1] | ... |
|---|---|---|---|---|---|---|---|---|---|---|---|---|---|---|---|
| 1 | x1 | y1 | z1 | α1 | β1 | γ1 | TRAVELING LANE | 2 | NONE | 17 | NONE | ... | 1 | 3 | ... |
| 2 | x2 | y2 | z2 | α2 | β2 | γ2 | PASSING LANE | NONE | 1 | 18 | NONE | ... | 1 | 4 | ... |
| 3 | x3 | y3 | z3 | α3 | β3 | γ3 | TRAVELING LANE | 4 | NONE | 1 | NONE | ... | 1 | 5 | ... |
| 4 | x4 | y4 | z4 | α4 | β4 | γ4 | PASSING LANE | NONE | 3 | 2 | NONE | ... | 1 | 6 | ... |
| 5 | x5 | y5 | z5 | α5 | β5 | γ5 | TRAVELING LANE | 6 | NONE | 3 | 14 | ... | 1 | 7 | ... |
| 6 | x6 | y6 | z6 | α6 | β6 | γ6 | PASSING LANE | NONE | 5 | 4 | NONE | ... | 1 | 8 | ... |
| 7 | x7 | y7 | z7 | α7 | β7 | γ7 | TRAVELING LANE | 8 | NONE | 5 | NONE | ... | 1 | 9 | ... |
| 8 | x8 | y8 | z8 | α8 | β8 | γ8 | PASSING LANE | NONE | 7 | 6 | NONE | ... | 1 | 10 | ... |
| 9 | x9 | y9 | z9 | α9 | β9 | γ9 | TRAVELING LANE | 10 | NONE | 7 | NONE | ... | 1 | 15 | ... |
| 10 | x10 | y10 | z10 | α10 | β10 | γ10 | PASSING LANE | NONE | NONE | 8 | NONE | ... | 1 | 16 | ... |
| 11 | x11 | y11 | z11 | α11 | β11 | γ11 | LAMP | NONE | NONE | NONE | NONE | ... | 1 | 12 | ... |
| 12 | x12 | y12 | z12 | α12 | β12 | γ12 | LAMP | NONE | NONE | 11 | NONE | ... | 1 | 13 | ... |
| 13 | x13 | y13 | z13 | α13 | β13 | γ13 | LAMP | NONE | NONE | 12 | NONE | ... | 1 | 14 | ... |
| 14 | x14 | y14 | z14 | α14 | β14 | γ14 | LAMP | NONE | NONE | 13 | NONE | ... | 1 | 5 | ... |

MAP INFORMATION TABLE

VEHICLE CONTROL SYSTEM AND SERVER

TECHNICAL FIELD

The present invention relates to a vehicle control system.

BACKGROUND ART

For autonomous driving or driving assistance, an autonomous driving map created at a lane level of a road is used. It is necessary to prevent determination that the vehicle currently travels on a road on the autonomous driving map in a case where the vehicle currently travels on the road that is not on the autonomous driving map, but on a road in the vicinity thereof.

A prior art in this field includes JP 2018-96743 A (PTL 1). In a road identifying device described in PTL 1, a road on which an own vehicle is traveling is specified based on autonomous driving map data including road data, navigation map data including data which is road data and of which a content partially overlaps that of the autonomous driving map data, and position information of the own vehicle whose position is measured by an external positioning system" (see ABSTRACT).

CITATION LIST

Patent Literature

PTL 1: JP 2018-96743 A

SUMMARY OF INVENTION

Technical Problem

As described above, PTL 1 describes that the navigation map data, which is not for autonomous driving, and the autonomous driving map data are used. However, there are problems in that the data size is large because the map data is duplicated, the processing cost is increased due to the increase in data size, and the map data that is not the autonomous driving map may be inaccurate. Therefore, an object of the present invention is to provide a vehicle control system in which the data size is smaller than that in a case where a map is duplicated and which prevents deterioration in accuracy of autonomous driving or driving assistance, and a map data distribution server that distributes map data to the vehicle control system.

Solution to Problem

A typical example of the invention disclosed in the present application is as follows. That is, a vehicle control system includes: an electronic control unit (ECU) which controls a vehicle; and a server which distributes map information to the electronic control unit, in which the map information includes information on a first type of road on which autonomous driving or driving assistance of the vehicle is possible, and information on a second type of road on which neither the autonomous driving nor the driving assistance are possible, the server includes an output unit which transmits, to the electronic control unit, information on a second type of road that exists in a predetermined range from a first type of road on which the vehicle is traveling, and that is formed so that the first type of road and the second type of road run side by side while forming a predetermined angle or less, and the electronic control unit includes a map management unit which manages the information on the first type of road and the information on the second type of road received from the server, and a vehicle control unit which controls traveling of the vehicle by using the information on the first type of road and the information on the second type of road.

Advantageous Effects of Invention

According to an aspect of the present invention, it is possible to decrease the size of map data and suppress the deterioration in accuracy of autonomous driving and driving assistance. Problems, configurations, and effects other than those described above will become apparent by the following description of embodiments.

BRIEF DESCRIPTION OF DRAWINGS

FIG. 12 is a diagram illustrating a configuration example of map data.

DESCRIPTION OF EMBODIMENTS

Embodiment 1

Figure 1:
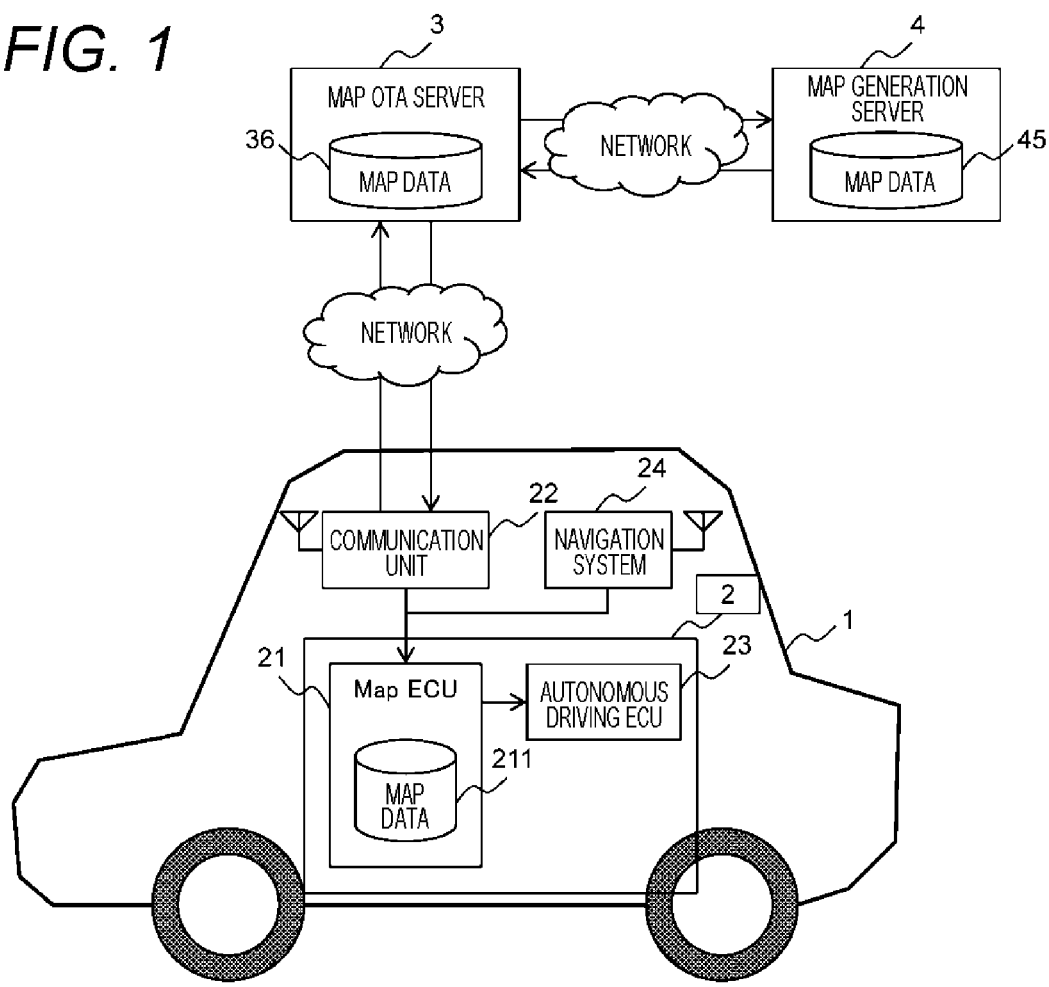
FIG. 1 is a diagram illustrating a configuration of this vehicle control system.

FIG. 1 is a diagram illustrating a configuration of a vehicle control system of Embodiment 1 of the present invention.

The vehicle control system of the present embodiment includes a map ECU 21, a map data storage unit 211, a communication unit 22, an autonomous driving ECU 23, and a navigation system 24, and is mounted on a vehicle 1. Further, an electronic control unit 2 is constituted by the map ECU 21 and the autonomous driving ECU 23. The vehicle control system is connected to a map OTA server 3 via a network, and the map OTA server 3 is connected to a map generation server 4 via a network.

The map ECU 21 manages map data stored in the map data storage unit 211. Specifically, the map ECU 21 receives map data from the map OTA server 3 via the communication unit 22, and stores the received map data in the map data storage unit 211. Further, the map ECU 21 interprets data contained in the map data storage unit 211 and transmits the data to the autonomous driving ECU 23. The detailed configuration of the map ECU 21 will be described later with reference to FIG. 2. The map data storage unit 211 stores highly accurate autonomous driving map data including information on each lane of a road for autonomous driving.

Further, the map ECU 21 determines a lane for the autonomous driving of the vehicle 1 using route information generated by the navigation system 24, and generates lane information.

Further, the map ECU 21 may determine whether or not the vehicle 1 is likely to be traveling on an expressway or a general road based on position information acquired from a GNSS receiver 213 and information on a vehicle speed calculated from the position information.

The communication unit 22 controls communication between the vehicle control system and the outside (the map OTA server 3 or the like).

When the lane information is received from the map ECU 21, the autonomous driving ECU 23 determines that the autonomous driving according to the route information generated by the navigation system 24 is possible. Then, the autonomous driving ECU 23 operates a steering, an accelerator, and a brake by using outside information acquired by a sensor (a camera, a radar, a LIDAR, or the like that is not illustrated) mounted on the vehicle 1 according to the lane information generated by the map ECU 21, thereby controlling the traveling of the vehicle 1. That is, in a case where autonomous driving map data representing a route is stored in the map data storage unit 211, and a traveling lane is determined, the autonomous driving ECU 23 determines that the autonomous driving is possible, and the autonomous driving ECU 23 of the present embodiment that starts the autonomous driving provides at least one of an autonomous driving function by which the vehicle 1 travels, without a driver's operation, on a specific road such as an expressway or a road for the exclusive use of automobiles, or a driving assistance function that assists the driver's operation to drive the vehicle 1.

In the present specification, the autonomous driving of the vehicle 1 by the map ECU 21 is mainly described, but similarly, the present invention may also be applied to the driving assistance function that assists the driver's operation to drive the vehicle 1 on a specific road (an expressway, a road for the exclusive use of automobiles, or the like).

Once an operator inputs a destination or a route, the navigation system 24 computes a travel route with reference to the road map and transmits the generated route information to the map ECU 21. The road map used by the navigation system 24 may be stored in a storage device built in the navigation system 24, or may be acquired from a map server (not illustrated) connected via a network. The map OTA server 3 may distribute a map for the navigation system 24. The route information generated by the navigation system 24 is transmitted to the map ECU 21.

The map ECU 21 and the autonomous driving ECU 23 are computers (electronic control devices) that control the vehicle 1, and a program stored in a storage medium (for example, a non-volatile memory) is executed to implement the functions of each ECU. Each of the ECUs 21 and 23 is connected to a communication means such as a controller area network (CAN) of the vehicle 1, and information from the GNSS receiver or a sensor (not illustrated) is input. The autonomous driving ECU 23 receives vehicle information such as the vehicle speed, steering angle, and shift position of vehicle 1 to control an actuator such as a steering, an accelerator, or a brake.

The map generation server 4 is a computer that generates map data to be transmitted to the map ECU 21, and transmits the generated map data to the map OTA server 3. The detailed configuration of the map generation server 4 will be described later with reference to FIG. 3.

The map OTA server 3 stores the map data received from the map generation server 4, and transmits the map data to the map ECU 21 in response to a request from the map ECU 21. The detailed configuration of the map OTA server 3 will be described later with reference to FIG. 4.

Figure 2:
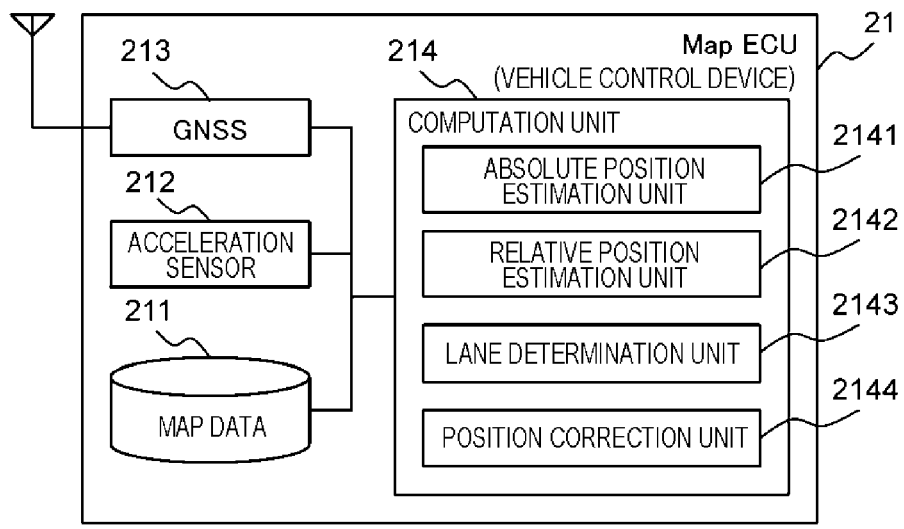
FIG. 2 is a block diagram of a map ECU.

FIG. 2 is a block diagram of the map ECU 21.

The map ECU 21 includes a map data storage unit 211, an acceleration sensor 212, the GNSS receiver 213, and a computation unit 214. The computation unit 214 controls the GNSS receiver 213, the acceleration sensor 212, and the map data storage unit 211 to specify the position of an own vehicle on a map.

The GNSS receiver 213 receives a signal from an artificial satellite and measures the position of the vehicle 1. The acceleration sensor 212 measures an acceleration applied to the vehicle 1 and computes the measured acceleration to calculate the moving speed, the moving distance, the moving direction, and the like. The map data storage unit 211 is a database that stores map data of expressways and general roads.

The computation unit 214 specifies the position of the own vehicle on the map by executing the program stored in the storage medium (for example, a non-volatile memory). The computation unit 214 includes an absolute position estimation unit 2141, a relative position estimation unit 2142, a lane determination unit 2143, and a position correction unit 2144. The absolute position estimation unit 2141 receives a signal from the artificial satellite and calculates the absolute position of the vehicle 1. The relative position estimation unit 2142 calculates the relative position, which is the position of the vehicle 1 on the map, from the calculated absolute position. The lane determination unit 2143 determines a lane in which the vehicle is traveling by using a highly accurate map created at a lane level and stored in the map data 211. The position correction unit 2144 corrects the absolute position of the vehicle 1 based on the estimated position of the vehicle 1 in the lane.

Figure 3:
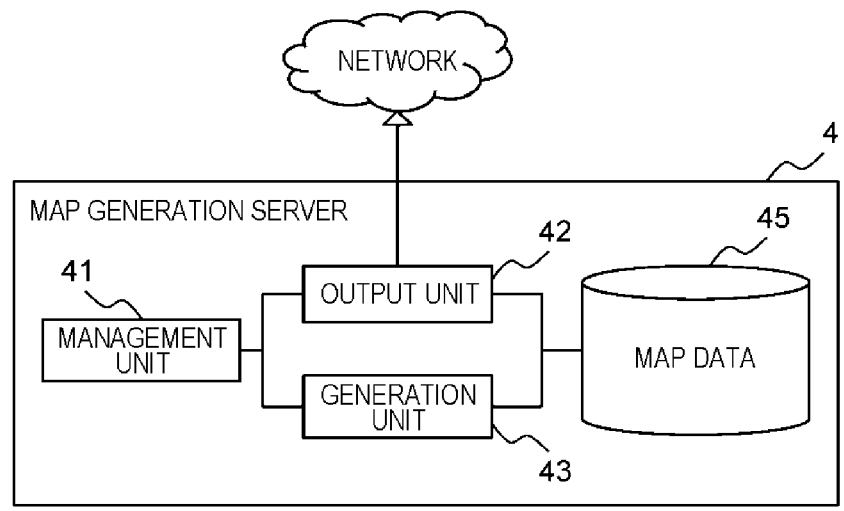
FIG. 3 is a block diagram of a map generation server.

FIG. 3 is a block diagram of the map generation server 4.

The map generation server 4 is a computer that generates map data to be provided to the map ECU 21. The map generation server 4 includes a management unit 41, an output unit 42, a generation unit 43, and a map data storage unit 45. The management unit 41 issues a command to other functional units to manage the entire map generation server 4. The generation unit 43 generates map data according to the command received from the management unit 41, and stores the generated map data in the map data storage unit 45. Processing performed by the generation unit 43 will be described later with reference to FIGS. 7, 8, 9, and 10. The output unit 42 extracts map data from the map data storage unit 45 according to the command received from the management unit 41, and outputs the map data to the outside. The map data storage unit 45 is a database that stores the map data generated by the generation unit 43.

Figure 4:
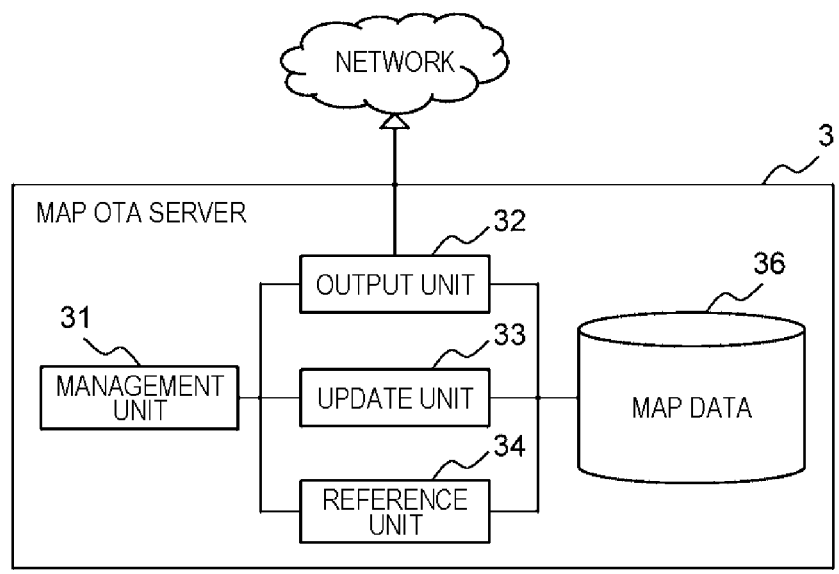
FIG. 4 is a block diagram of a map Over-the-Air (OTA) server.

FIG. 4 is a block diagram of the map OTA server 3.

The map OTA server 3 is a computer that stores the map data received from the map generation server 4, and transmits the map data to the map ECU 21 in response to the request from the map ECU 21. The map OTA server 3 includes a management unit 31, an output unit 32, an update unit 33, a reference unit 34, and a map data storage unit 36. The management unit 31 issues a command to other functional units to manage the entire map OTA server 3. The update unit 33 updates the map data stored in the map data storage unit 45 using the map data received from the map generation server 4 in accordance with the command received from the management unit 31. The reference unit 34 refers to the map data stored in the map data storage unit 36 in response to a request from the map ECU 21. The map data stored in the map data storage unit 36 can be handled in a mesh unit, which is a distribution unit of the map data from the map OTA server 3. The output unit 32 outputs the map data referred to in response to the request from the map ECU 21 to the outside via the network. The map data storage unit 36 is a database that stores the map data received from the map generation server 4.

Figures 5, 6:
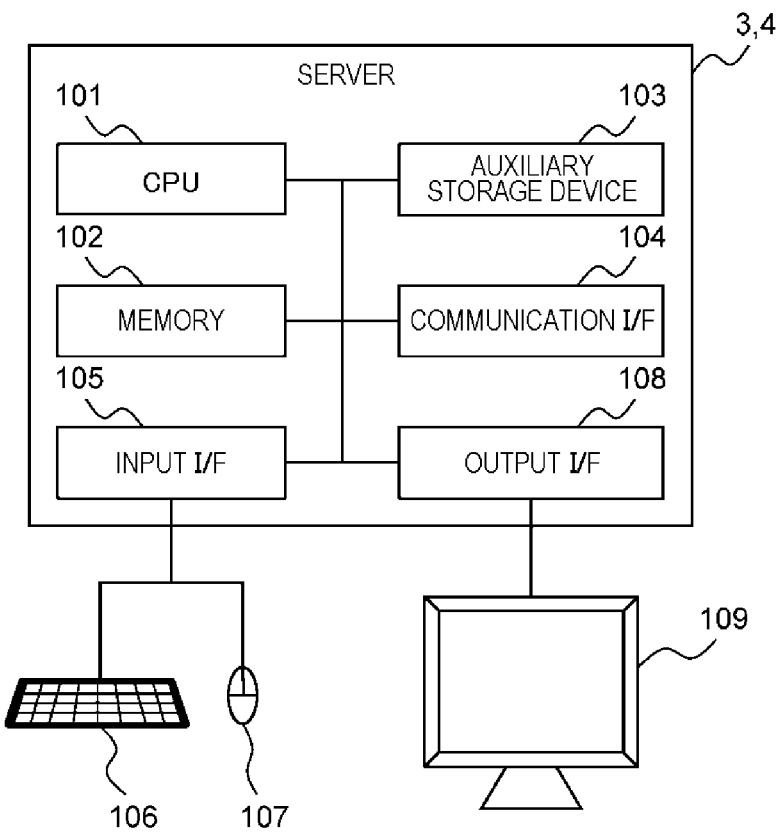
FIG. 5 is a block diagram illustrating a physical configuration of the server.
FIG. 6 is a diagram illustrating an example in which the map ECU requests, to the map OTA server, for download of map data (mesh) of a position that is a certain distance away.

FIG. 5 is a block diagram illustrating a physical configuration of the computer that implements each of the map OTA server 3 and the map generation server 4.

The computer that implements each of the servers 3 and 4 includes a processor (central processing unit (CPU)) 101, a memory 102, an auxiliary storage device 103, and a communication interface 104. The computer may include an input interface 105 and an output interface 108. The processor (CPU) 101, the memory 102, the auxiliary storage device 103, the communication interface 104, the input interface 105, and the output interface 108 are accessibly connected by a communication means such as a bus.

The processor 101 is a computation device that executes a program stored in the memory 102. The processor 101 executes various programs, thereby implementing various functions of the server. Note that a part of the processing performed by the processor 101 executing the program may be performed by another computation device (for example, a field programmable gate array (FPGA) or application-specific integrated circuit (ASIC)).

The memory 102 includes a read only memory (ROM) which is a non-volatile storage element and a random access memory (RAM) which is a volatile storage device. The ROM stores an invariable program (for example, BIOS). The RAM is a high-speed and volatile storage device such as a dynamic random access memory (DRAM), and temporarily stores a program executed by the processor 101 and data used when the program is executed.

The auxiliary storage device 103 is a large-capacity non-volatile storage device such as a magnetic storage device (hard disk drive (HDD)) or a flash memory (solid state drive (SSD)). Further, the auxiliary storage device 103 stores data used by the processor 101 when executing the program, and the program executed by the processor 101. That is, the program is read from the auxiliary storage device 103, loaded to the memory 102, and executed by the processor 101 to implement each function of the server.

The communication interface 104 is a network interface device that controls communication with other devices according to a predetermined protocol.

The input interface 105 is an interface to which an input device such as a keyboard 106, a mouse 107, or a touch panel (not illustrated) is connected, and which receives an input from the operator. The output interface 108 is an interface to which an output device such as a display device 109 or a printer (not illustrated) is connected and which outputs a result of executing the program in a format that can be visually recognized by the operator.

The program executed by the processor 101 is provided to the server via a removable medium (a CD-ROM, a flash memory, or the like) or a network, and is stored in the non-volatile auxiliary storage device 103, which is a non-temporary storage medium. Therefore, the server may include an interface for reading data from the removable medium.

The map OTA server 3 and the map generation server 4 are each a computer system implemented on one physical computer or a plurality of logically or physically configured computers, and may be operated on a virtual computer built with a plurality of physical computer resources.

FIG. 6 is a diagram illustrating an example in which the map ECU 21 requests, to the map OTA server 3, for download of map data (mesh) of a position that is a certain distance away.

The map ECU 12 transmits the position of the own vehicle (latitude and longitude information), the number of the map data (mesh) to be downloaded, and the remaining capacity of a storage area, and requests, to the map OTA server 3, for download of map data of a position that is a certain distance away from the position of the own vehicle. For example, in a case illustrated in FIG. 6, 309089752, 309089753, 309089756, 309089757, 309089759, and 309089781 are transmitted as mesh numbers of the map data to be downloaded. The map OTA server 3 transmits the requested map data to the map ECU 21.

Figure 7:
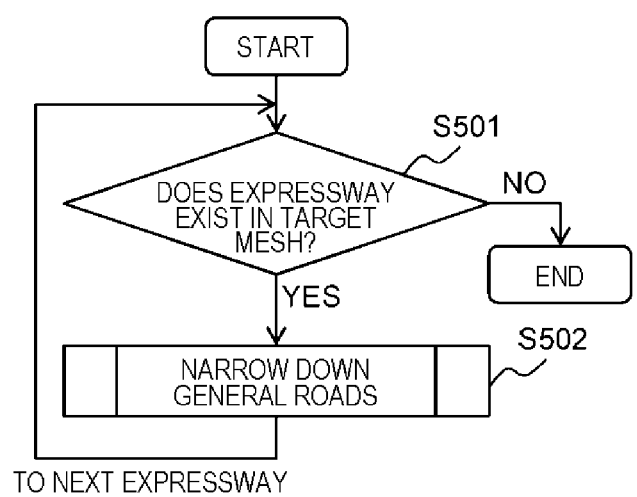
FIG. 7 is a flowchart of processing performed by a generation unit of the map generation server.
Figure 8:
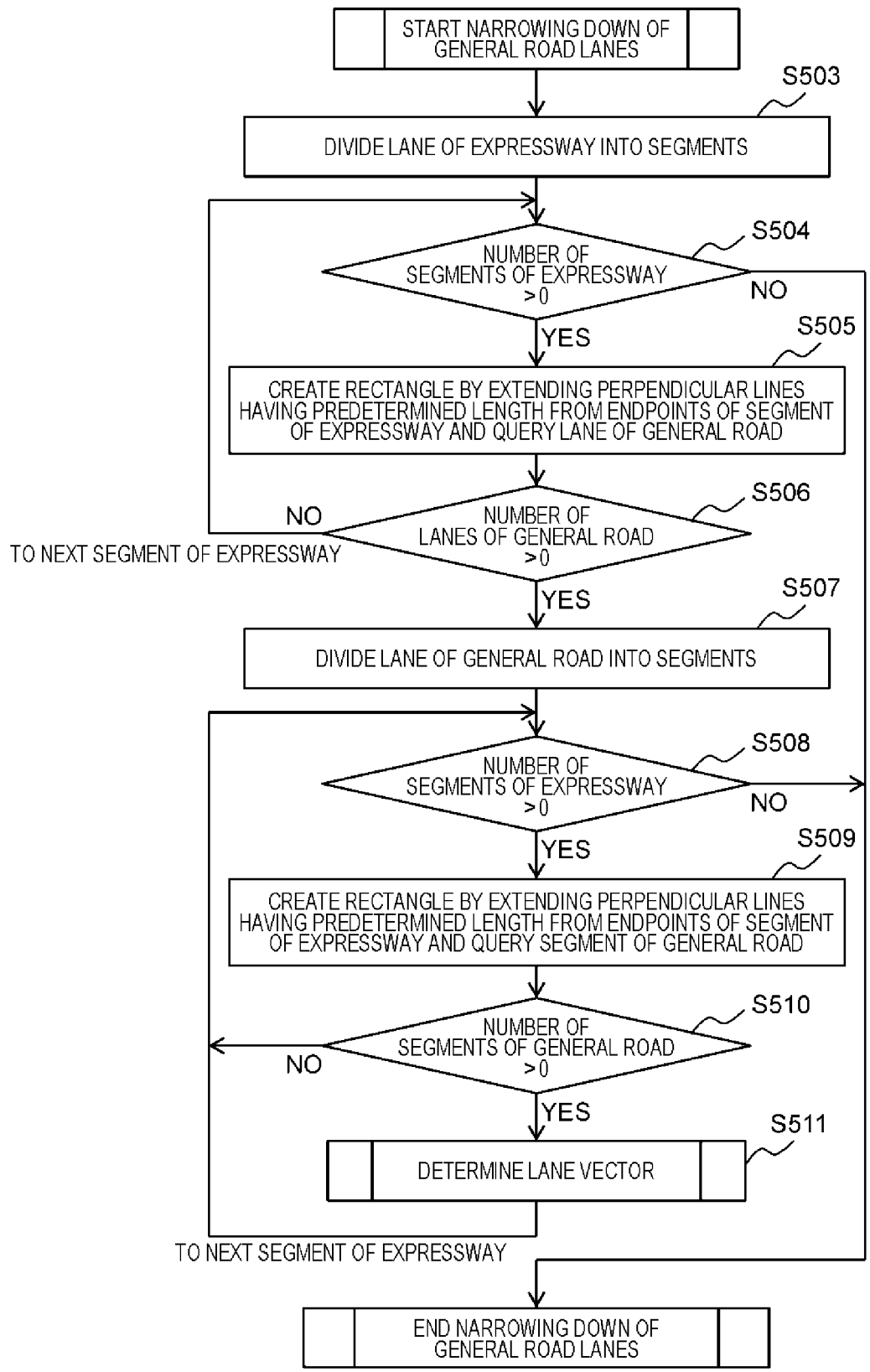
FIG. 8 is a flowchart of processing of narrowing down general road lanes.
Figure 9:
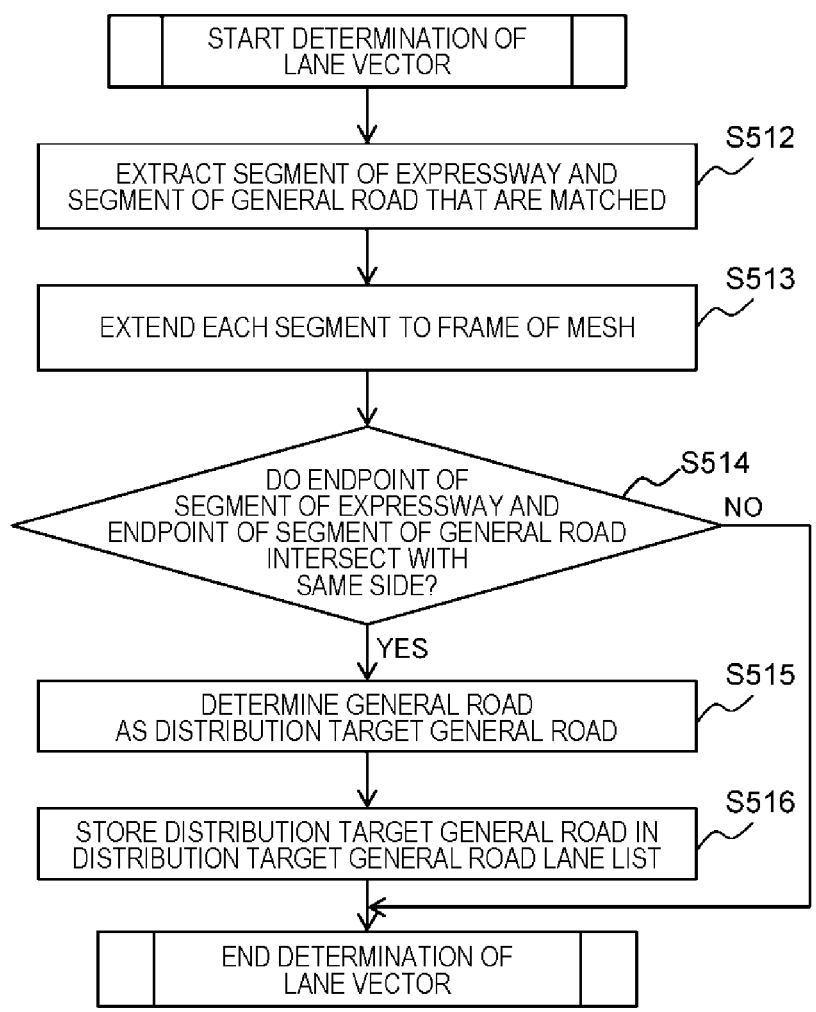
FIG. 9 is a flowchart of lane vector determination processing.
Figure 10:
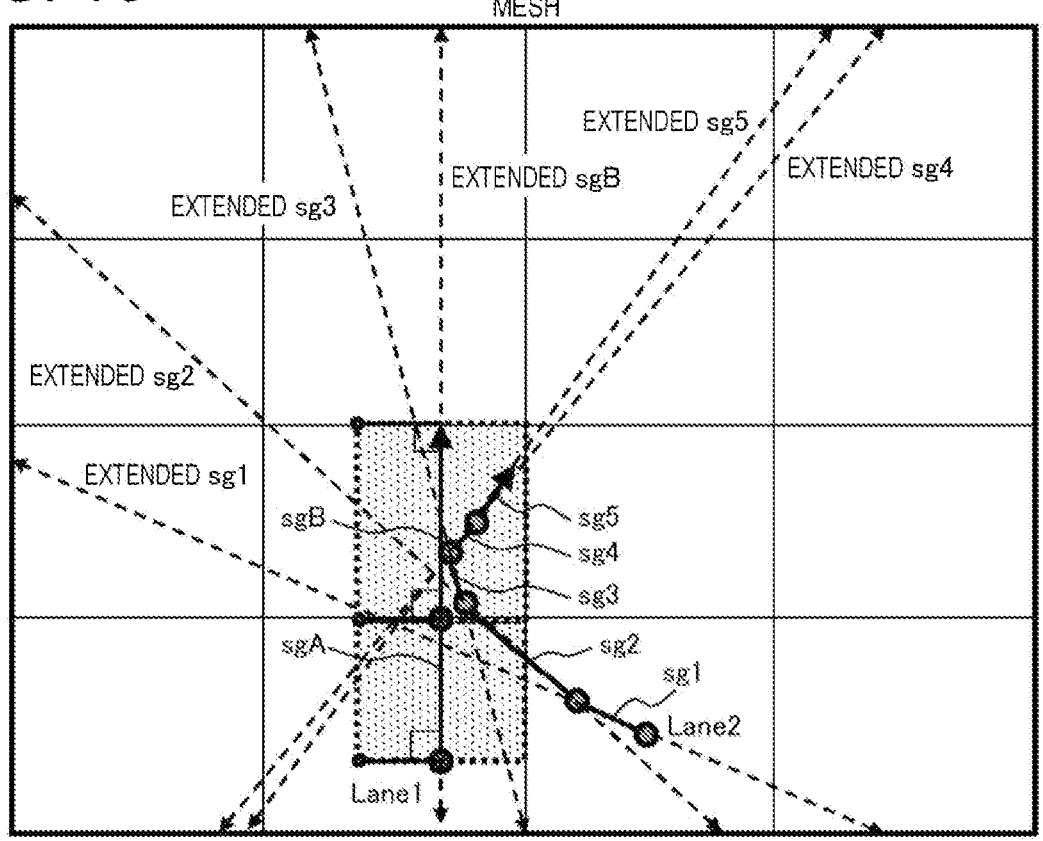
FIG. 10 is a diagram illustrating a specific example of specifying information on a general road as a distribution target.

FIGS. 7, 8, and 9 are flowcharts of the processing performed by the generation unit 43 of the map generation server 4, and FIG. 10 is a diagram illustrating a specific example of the processing. Operations based on the flowcharts in FIGS. 7, 8, and 9 and the specific example in FIG. 10 are as follows.

First, once a command to generate map data of a target mesh is received from the management unit 41, the generation unit 43 determines whether or not an expressway exists in the target mesh (S501). Then, in a case where an expressway exists in the target mesh, processing of narrowing down general roads (see FIG. 8) is performed (S502). On the other hand, in a case where no expressway exists in the target mesh, the processing ends.

In the processing of narrowing down general road lanes, as illustrated in FIG. 8, the generation unit 43 divides map data of the expressway into segments (S503). For example, one lane (Lane1) is divided into a plurality of segments (sgA and sgB).

Then, the generation unit 43 determines whether the number of unprocessed segments of the expressway is larger than 0 (S504). In a case where the determination result indicates that all the segments of the expressway have been processed, the processing ends. On the other hand, in a case where there is an unprocessed segment of the expressway, the generation unit 43 extends perpendicular lines having a predetermined length from endpoints of the segments of the expressway to create a rectangle, and queries map data (lane) of a general road (S505). For example, a rectangle is created by extending perpendicular lines passing through the endpoints of the plurality of segments sgA and sgB, a query is created to extract a general road in the created rectangle, and data of a lane of the general road in the rectangle is acquired. For example, one lane (Lane2) of the general road is acquired.

Thereafter, the generation unit 43 determines whether or not the number of unprocessed lanes of the general road among lanes of the general road acquired by the query is larger than 0 (S506).

In a case where all the lanes of the general road have been processed, the processing returns to Step S504, and the next segment of the expressway is processed. On the other hand, in a case where there is an unprocessed lane of the general road, the generation unit 43 divides map data (lane) of the general road into segments (S507). For example, the lane (Lane2) of the general road is divided into a plurality of segments (sg1, sg2, sg3, sg4, and sg5).

Then, the generation unit 43 determines whether or not the number of segments of the expressway is larger than 0 (S508). In a case where the determination result indicates that all the segments of the expressway have been processed, the processing ends. On the other hand, in a case where there is an unprocessed segment of the expressway, the generation unit 43 extends perpendicular lines having a predetermined length from endpoints of the segments of the expressway to create a rectangle, and queries map data (segment) of a general road (S509). For example, a rectangle is created by extending perpendicular lines passing through the endpoints of the plurality of segments sgA and sgB, a query is created to extract a general road in the created rectangle, and data of a segment of the general road in the rectangle is acquired.

Thereafter, the generation unit 43 determines whether or not the number of unprocessed segments of the general road among segments of the general road acquired by the query is larger than 0 (S510).

In a case where all the segments of the general road have been processed, the processing returns to Step S508, and the next segment of the expressway is processed. On the other hand, in a case where there is an unprocessed segment of the general road, the generation unit 43 performs lane vector determination processing (see FIG. 9) (S511).

In the lane vector determination processing, as illustrated in FIG. 9, the generation unit 43 extracts the segment of the expressway and the segment of the general road queried from the segment of the expressway (S512). For example, sg2 is extracted for sgA, and sg2, sg3, sg4, and sg5 are extracted for sgB.

Then, the generation unit 43 extends each of the segments of the expressway and the segments of the general road to a mesh frame in both a vector direction and a direction opposite to the vector direction (S513). For example, sgA, sgB, sg1, sg2, sg3, sg4, and sg5 are extended in the vector direction and the direction opposite to the vector direction. Here, an angle determination area is defined. For example, as illustrated in FIG. 10, an angle determination area is defined by dividing one mesh into 16 pieces (4×4). The size of the angle determination area may be changed depending on how parallel the expressway and a general road to be determined as a distribution target are.

Thereafter, the generation unit 43 determines whether or not the extended segment of the expressway and the extended segment of the general road intersect with the same side of the angle determination area (S514). Then, in a case where the endpoint of the extended segment of the expressway and the endpoint of the extended segment of the general road do not intersect with the same side of the angle determination area, the lane vector determination processing ends. On the other hand, in a case where the endpoint of the extended segment of the expressway and the endpoint of the extended segment of the general road intersect with the same side of the angle determination area, the generation unit 43 determines that the general road and the expressway related to the extended segments are nearly parallel to each other, and determines, as distribution target map data, map data of the general road related to the extended segment of the general road (S515), and the generation unit 43 stores the distribution target map data in a distribution general road lane list (S516). For example, since upper endpoints of the extended sgB and sg3 are in the same mesh and lower endpoints thereof are also in the same mesh, Lane2 is determined as the general road that is the distribution target.

As described above, in the first embodiment, whether or not the expressway and the general road run side by side while forming a predetermined angle or less is determined based on whether or not the extended line of the segment of the expressway and the extended line of the segment of the general road intersect with the same side of the angle determination area.

Figure 11:
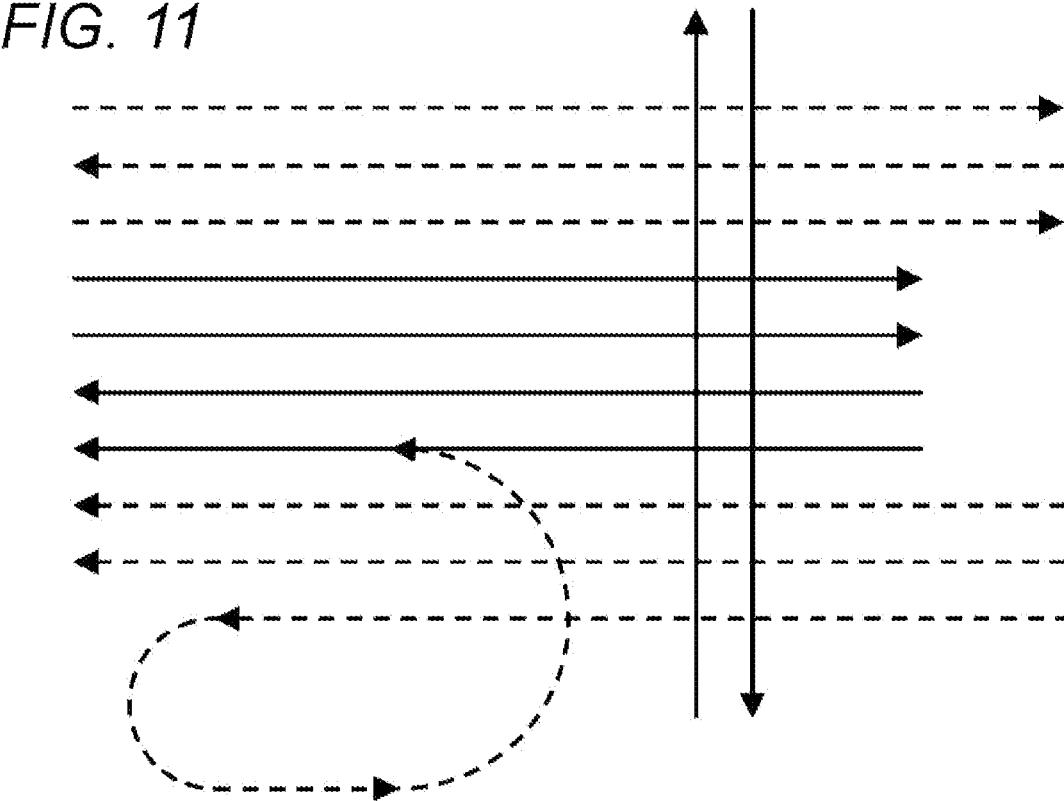
FIG. 11 is a diagram illustrating an example in which, when a vehicle is traveling on a general road that does not exist in a map data storage unit, erroneous determination that the vehicle is traveling on a road on an expressway that exists in the map data storage unit is made.

FIG. 11 is a diagram illustrating an example in which, when the vehicle is traveling on a general road that does not exist in the map data storage unit 211, erroneous determination that the vehicle is traveling on a road on an expressway that exists in the map data storage unit 211 is made.

In a case where the map data storage unit 211 does not have data on the general road in a section where the general road and the expressway run side by side, matching to a lane of the expressway indicated by a solid line arrow may be made when the vehicle is traveling on a lane of the general road indicated by a broken line arrow. However, by acquiring map data of the general road from the map OTA server 3 according to the present embodiment, it is possible to reduce a possibility that matching to the expressway is made when the vehicle is traveling on the general road.

Note that the map data download request is appropriately generated as the vehicle 1 moves, and unnecessary mesh map data is deleted from the map data storage unit 211.

FIG. 12 is a diagram illustrating a configuration example of the map data stored in the map data storage unit 211.

The map data stored in the map data storage unit 211 is highly accurate autonomous driving map data including information on each lane of a road, and is represented by a set of links defined for each lane ID, and the links are divided into segments. That is, the map data includes a lane ID, a latitude of a start point, a longitude of the start point, an altitude of the start point, a latitude of an end point, a longitude of the end point, an altitude of the end point, the type of a lane, a right lane ID, a left lane ID, a rear side lane ID, and a front side lane ID.

The latitude of the start point, the longitude of the start point, and the altitude of the start point indicate the position of the start point of a corresponding link, and the latitude of the end point, the longitude of the end point, and the altitude of the end point indicate the position of the end point of the corresponding link. The lane type indicates the link type to which the corresponding link belongs, and includes, for example, a traveling lane, a passing lane, a lamp, and the like. The right lane ID and the left lane ID are IDs of the right lane and the left lane, respectively, on a road in which a plurality of lanes are arranged. The rear side lane ID and the front side lane ID are IDs of a lane on the front side in a traveling direction of the corresponding link, and the next lane in the traveling direction, respectively.

Embodiment 2

Next, Embodiment 2 of the present invention will be described. In Embodiment 2, segments are vectorized to calculate the inner product regardless of the extended lines of the segments, and whether or not an expressway and a general road run side by side while forming a predetermined angle or less is determined based on a difference between two directions.

The inner product of two segments sgP and sgQ is expressed by Equation 1, and an angle formed between the two segments sgP and sgQ is expressed by Equation 2.

$$sgP \cdot sgQ = |sgP| \, |sgQ| \cos \theta \quad (1)$$

$$\cos \theta = sgP \cdot sgQ / (|sgP| \, |sgQ|) \quad (2)$$

In Equation 2, when the two segments sgP and sgQ are parallel to each other, cos θ is 1. Therefore, in a case where a predetermined threshold is set, and a condition of Equation 3 is satisfied, it can be determined that there is almost no angle between the two segments, that is, the expressway and the general road are parallel to each other.

$$|1-\cos \theta| < \text{Threshold} \tag{3}$$

In the above-described example, the map OTA server 3 determines whether or not the expressway and the general road are parallel to each other, but the vehicle may determine whether or not there is a general road parallel to the expressway.

As described above, in the vehicle control system of the embodiment of the present invention, the map information distribution server (map OTA server 3) includes the output unit 32 which transmits, to the electronic control unit 2, information on a second type of road (general road) that exists in a predetermined range from a first type of road (expressway) on which the vehicle is traveling, and that is formed so that the first type of road and the second type of road run side by side while forming a predetermined angle or less, and the map ECU 21 includes a map management unit (map ECU 21) which manages information on an expressway and information on a general road received from the map OTA server 3, and a vehicle control unit (autonomous driving ECU 23) which controls the traveling of the vehicle 1 by using the information on the expressway and a part of the information on the general road that is necessary for the control, and thus, the data size can be smaller than that in a case where a map is duplicated and deterioration in accuracy of autonomous driving can be prevented.

Further, the map ECU 21 includes a storage device (map data storage unit 211) which stores information on the expressway and information on the second type of road, and when a route along which the vehicle 1 is to travel is collated with the information on the expressway and the information on the general road, and a lane in which the vehicle 1 is to travel is determined, the autonomous driving ECU 23 determines that autonomous driving is possible, and thus, the autonomous driving function or driving assistance function can be provided for only a road for which autonomous driving map data is prepared.

Further, the map OTA server 3 specifies a general road existing in a rectangle created by connecting endpoints of perpendicular lines extended by predetermined distances from endpoints of segments of an expressway, as a general road existing in a predetermined range from the expressway on which the vehicle is traveling, and thus, it is possible to determine a general road existing in the vicinity of the expressway by simple computation.

Further, the map OTA server 3 specifies information on a general road to be transmitted to the electronic control unit 2 (map ECU 21) in a unit of mesh, map data can be easily managed by using a mesh number as a key.

In addition, in a case where, in a region that includes a plurality of meshes including a mesh in which both a segment of an expressway and a segment of a general road exist, extended lines of two segments pass through the same side, the map OTA server 3 determines that the expressway and the general road run side by side while forming a predetermined angle or less, and thus, it is possible to determine a general road that is formed substantially parallel to the expressway by simple computation.

Further, in a case where an angle formed between a direction of a segment of an expressway and a direction of a segment of a general road is less than a predetermined angle, the map OTA server 3 determines that the expressway and the general road run side by side while forming the predetermined angle or less. As a result, it is possible to determine a general road that is formed substantially parallel to the expressway by using a known function (by vector computation using the inner product).

Note that the present invention is not limited to the above-described embodiments, but includes various modifications and equivalent configurations within the scope of the appended claims. For example, the above-described embodiments have been described in detail in order to explain the present invention in an easy-to-understand manner, and the present invention is not necessarily limited to those having all the configurations described. Further, a part of the configuration of one embodiment may be replaced with the configuration of another embodiment. In addition, the configuration of another embodiment may be added to the configuration of one embodiment. In addition, a part of the configuration of each embodiment may be added with another configuration, may be deleted, and may be replaced with another configuration.

Further, a part of, or the entirety of the respective configurations, functions, processing units, processing means, and the like described above may be implemented by hardware, for example, may be designed as an integrated circuit, or may be implemented by software for a processor interpreting and executing programs for implementing the respective functions.

Information such as a program, a table, and a file for implementing each function can be stored in a storage device such as a memory, a hard disk, or an SSD, or a recording medium such as an IC card, an SD card, or a DVD.

In addition, the control lines and information lines indicate those considered necessary for explanation, and do not necessarily indicate all the control lines and information lines necessary for implementation. In actual implementation, it may be considered that almost all configurations are interconnected.

REFERENCE SIGNS LIST

1 vehicle
2 electronic control unit
21 MapECU
211 map data storage unit
212 acceleration sensor
213 GNSS receiver
214 computation unit
2141 absolute position estimation unit
2142 relative position estimation unit
2143 lane determination unit
2144 position correction unit
22 communication unit
23 autonomous driving ECU
24 navigation system
3 map OTA server
31 management unit
32 output unit
33 update unit
34 reference unit
36 map data storage unit
4 map generation server
41 management unit
42 output unit
43 generation unit
45 map data storage unit

The invention claimed is:

1. A vehicle control system comprising:
an electronic control unit which controls a vehicle; and
a server which distributes map information to the electronic control unit,
wherein the map information includes information on a first type of road on which autonomous driving or driving assistance of the vehicle is possible, and information on a second type of road on which neither the autonomous driving nor the driving assistance of the vehicle are possible,
the server transmits, to the electronic control unit, information on the second type of road that exists in a predetermined non-zero range from the first type of road on which the vehicle is traveling, and that is formed so that the first type of road and the second type of road run side by side in a predetermined angle or less, and
the electronic control unit includes one or more processors and one or more non-transitory computer-readable storage media, the non-transitory computer- readable storage media having stored thereon at least:
a map management unit which manages the information on the first type of road and the information on the second type of road received from the server, and
a vehicle control unit which controls traveling of the vehicle by using the information on the first type of road and the information on the second type of road.

2. The vehicle control system according to claim 1, wherein the map management unit includes a memory which stores the information on the first type of road and the information on the second type of road, and
when a route along which the vehicle is to travel is collated with the information on the first type of road and the information on the second type of road, and a lane in which the vehicle is to travel is determined, the vehicle control unit determines that the autonomous driving is possible.

3. The vehicle control system according to claim 1, wherein the information on the first type of road and the information on the second type of road are divided into segments, and
the server specifies, as the second type of road existing in a predetermined range from the first type of road on which the vehicle is traveling, the second type of road existing in a rectangle created by connecting endpoints of perpendicular lines extended by a predetermined distance from endpoints of the segments of the first type of road.

4. The vehicle control system according to claim 1, wherein the information on the first type of road and the information on the second type of road are divided into predetermined meshes, and
the server specifies the information on the second type of road to be transmitted to the electronic control unit in a unit of mesh.

5. The vehicle control system according to claim 4, wherein in a case where, in a region that includes a plurality of meshes including a mesh in which both a segment of the first type of road and a segment of the second type of road exist, extended lines of two segments pass through the same side of an angle determination area, the server determines that the first type of road and the second type of road run side by side in the predetermined angle or less.

6. The vehicle control system according to claim 1, wherein the information on the first type of road and the information on the second type of road are divided into segments, and
in a case where an angle formed between a direction of the segment of the first type of road and a direction of the segment of the second type of road is less than the predetermined angle, the server determines that the first type of road and the second type of road run side by side in the predetermined angle or less.

7. A server which distributes map information to an electronic control unit mounted on a vehicle, the server comprising:
a processor which performs predetermined processing to implement each functional unit; and
a memory which is accessible by the computation device,
wherein the map information includes information on the first type of road on which autonomous driving or driving assistance of the vehicle is possible, and information on the second type of road on which neither the autonomous driving nor the driving assistance of the vehicle are possible, and
the computation device transmits, to the electronic control unit, information on a second type of road that exists in a predetermined non-zero range from a first type of road on which the vehicle is traveling, and that is formed so that the first type of road and the second type of road run side by side in a predetermined angle or less.

8. The server according to claim 7, wherein the information on the second type of road transmitted to the electronic control unit is used to determine whether or not the autonomous driving is possible.

9. The server according to claim 7, wherein the information on the first type of road and the information on the second type of road are divided into segments, and
the server specifies, as the second type of road existing in a predetermined range from the first type of road on which the vehicle is traveling, the second type of road existing in a rectangle created by connecting endpoints of perpendicular lines extended by a predetermined distance from endpoints of the segments of the first type of road.

10. The server according to claim 7, wherein the information on the first type of road and the information on the second type of road are divided into predetermined meshes, and
the server specifies the information on the second type of road to be transmitted to the electronic control unit in a unit of mesh.

11. The server according to claim 10, wherein in a case where, in a region that includes a plurality of meshes including a mesh in which both a segment of the first type of road and a segment of the second type of road exist, extended lines of two segments pass through the same side of an angle determination area, the server determines that the first type of road and the second type of road run side by side in the predetermined angle or less.

12. The server according to claim 7, wherein the information on the first type of road and the information on the second type of road are divided into segments, and
in a case where an angle formed between a direction of the segment of the first type of road and a direction of the segment of the second type of road is less than the predetermined angle, the server determines that the first type of road and the second type of road run side by side in the predetermined angle or less.

* * * * *